US012062870B2

(12) United States Patent
Wagner et al.

(10) Patent No.: US 12,062,870 B2
(45) Date of Patent: Aug. 13, 2024

(54) SINGLE CONDUCTOR CONNECTOR GUARD

(71) Applicant: DISNEY ENTERPRISES, INC., Burbank, CA (US)

(72) Inventors: Ken W. Wagner, Santa Ana, CA (US); Scott Carlton Peterson, Westminster, CA (US); Chris M. Dodge, Anaheim, CA (US)

(73) Assignee: Disney Enterprises, Inc., Burbank, CA (US)

( * ) Notice: Subject to any disclaimer, the term of this patent is extended or adjusted under 35 U.S.C. 154(b) by 268 days.

(21) Appl. No.: 17/587,363

(22) Filed: Jan. 28, 2022

(65) Prior Publication Data

US 2023/0246385 A1 Aug. 3, 2023

(51) Int. Cl.
*H01R 13/639* (2006.01)
*H01R 13/518* (2006.01)

(52) U.S. Cl.
CPC ......... *H01R 13/639* (2013.01); *H01R 13/518* (2013.01); *H01R 13/6397* (2013.01)

(58) Field of Classification Search
CPC ..................................................... H01R 13/518
See application file for complete search history.

(56) References Cited

U.S. PATENT DOCUMENTS 2,431,999 A * 12/1947 Engelhardt .............. H02G 3/16 439/724
3,499,102 A * 3/1970 Gillemot .................. H02G 3/14 439/367
3,624,277 A * 11/1971 Drake ................ H01R 13/6392 439/367

(Continued)

FOREIGN PATENT DOCUMENTS

CN 208835721 U 5/2019

OTHER PUBLICATIONS

"Relicon Gel Cable Connectors: Reliable Protection for Electrical Connections" Electric Way Internet Blog. Jan. 11, 2021.

(Continued)

*Primary Examiner* — Neil Abrams
(74) *Attorney, Agent, or Firm* — Onyx IP Group

(57) ABSTRACT

A conductor connector guard adapted for enclosing or housing one-to-many junctions between separable connectors. The guard is configured to house separable connectors for 3-channel, 5-channel, or 7-channel power distribution, with some of the embodiments presented being configured to house five pairs of separable connectors, with the connectors taking the form of single-pole conductor connectors in some cases. The guard is designed to comply with safety requirements for power distribution junctions that may be positioned within a public space. The guard is configured to provide a compact solution when contrasted with prior configurations involving physical barriers around power distribution junctions or involving physical objects such as trash cannisters and planters being placed over junctions. The guard is also adapted to provide enhanced public safety for spliced or joined conductors and to sequester energy sources in public spaces such as with a lock and tag out-type device.

20 Claims, 6 Drawing Sheets

(56) References Cited

U.S. PATENT DOCUMENTS

| | | | | | |
|---|---|---|---|---|---|
| 4,227,764 | A * | 10/1980 | Fiske | H01R 25/006 | 439/573 |
| 4,229,616 | A * | 10/1980 | Hotchkiss | H01R 13/516 | 174/92 |
| 4,382,649 | A * | 5/1983 | Meyer | H01R 13/518 | 439/367 |
| 4,449,015 | A * | 5/1984 | Hotchkiss | H02G 3/088 | 439/522 |
| 5,569,882 | A * | 10/1996 | Yokoyama | H02G 15/003 | 174/76 |
| 6,099,340 | A * | 8/2000 | Florentine | H02G 15/113 | 439/367 |
| 6,481,036 | B1 * | 11/2002 | Duvall | H02G 9/04 | 414/921 |
| 7,066,760 | B2 * | 6/2006 | Sokol | H02G 15/113 | 439/367 |
| 7,118,400 | B1 * | 10/2006 | Lopez | H01R 9/2441 | 439/620.29 |
| 7,592,547 | B2 | 9/2009 | Lubanski | | |
| 7,939,759 | B2 * | 5/2011 | Henry | H02G 3/0406 | 174/101 |
| 8,031,471 | B2 | 10/2011 | Schmitt | | |
| 8,870,587 | B2 * | 10/2014 | Nooner | H01R 13/516 | 439/165 |
| 10,847,925 | B2 | 11/2020 | Natoli et al. | | |
| 2023/0246385 | A1 * | 8/2023 | Wagner | H01R 13/447 | 439/304 |

OTHER PUBLICATIONS

“Insulated Cable Joint Rapid Joint” Internet. 2021.

“Five Channel 1 3/8" push button lid Cord Cover” Elasco Products. Internet. 2021.

“Water Tight Gel Insulated Joints” Shark Gel Insulated Joints. Wiska UK Ltd. 2021.

* cited by examiner

SINGLE CONDUCTOR CONNECTOR GUARD

BACKGROUND

1. Field of the Description

The present description relates, in general, to electrical connectors and protective guards for such connectors. More particularly, the description relates to a guard adapted for electrical connectors, such as single-pole connectors used in 3-channel, 5-channel, and other applications.

2. Relevant Background

There are many power distribution applications where it is desirable to run electrical power lines from a power source to one-to-many electrical components. For example, outdoor entertainment applications often require power lines, e.g., 3 to 7 lines or the like to provide the wires or conductors for neutral, ground, and hot, to be run long distances, e.g., 100 to 400 feet or more. To provide such long runs, two or more coils or cables will have to be joined or connected together. For example, a conventional power cable or line may be 50 feet long such that two or more junctions of the lines will be used to obtain the desired longer run. The single conductor, high-current power distribution is often made with five, parallel 4/0 American wire gauge, Type W cables provided in 50-foot segments or coils. Due to their weight, interconnecting each cable may be achieved with a 400 A-rated, single pole connector (e.g., Cam-Lok™ connectors or the like).

The junctions for the set of wires or lines are typically made up of a set of single-pole connectors (or single conductor connectors). These connectors include plugs and receptacles that are adapted to allow workers to quickly connect and disconnect the conductors without tools such as using cam-style single pole connectivity designs. Such junctions or sets of spliced/connected conductors are used extensively as solutions for motors, generators, indoor and outdoor lighting distribution panels, stand-by power, and other power applications. These power junctions need to be implemented to comply with all applicable safety standards, including, in the United States, guarding as defined in the National Electrical Code (NEC), as separating these connectors when they are under full load can result in an arc flash and arc blast that can cause harm to those within several feet of the junction.

One approach used by many is to arrange the runs of power distribution lines to avoid having any junctions in public spaces, but this approach is often not practical or even possible to achieve desired power distribution in outdoor and other large spaces. Another common solution involves setting up physical barriers around each junction or set of single conductor connectors. However, such an approach is not desirable in settings where space is at a premium as the barriers require substantial amounts of physical real estate in which it may be desirable to allow the public to freely move. In some cases, large physical objects are placed over the junctions such as trash containers or a landscaping planter, but this approach also can be problematic as it can use up valuable space and may require special or additional guards or components to meet applicable safety standards. In some cases, the junctions are simply wrapped in cloth or plastic sheeting with or without tape, which often is an unacceptable long term or even short term solution.

Hence, there remains a need for a new guard design for use in protecting connectors used to electrically couple single pole conductors. Preferably, the new guards would be adapted to ensure public safety and would also provide proper enclosures for the connectors to sequester the energy sources and support conventional lock and tagout procedures.

SUMMARY

In brief, a conductor connector guard is described that is adapted for enclosing or housing one-to-many junctions between separable connectors. For example, the guard is configured to house separable connectors for 3-channel, 5-channel, or 7-channel power distribution, with some of the embodiments presented being configured to house five pairs of separable connectors, with the connectors taking the form of single-pole conductor connectors in some cases (e.g., Cam-Lok™ connectors or the like).

The guard is designed to comply with safety requirements for power distribution junctions that may be positioned within a public space, such as safety requirements set out in the NEC in the United States. The guard is configured to provide a compact solution when contrasted with prior configurations involving physical barriers around power distribution junctions or involving physical objects such as trash cannisters and planters being placed over junctions. The guard is also adapted to provide enhanced public safety for spliced or joined conductors and to sequester energy sources in public spaces such as with a lock and tag out-type device.

More particularly, an apparatus for guarding a set of connectors used to electrically connect a set of conductors (e.g., single pole cables or conductors). The apparatus or "guard" includes a body and an inner chamber within the body for receiving the connectors. The inner chambre is defined by a planar base, spaced apart first and second sidewalls extending orthogonally from an inner side of the base, a pair of spaced-apart end walls extending from the inner side of the base, and a lid. The lid is pivotally attached to the first sidewall so as to be positionable between an open position, with a side of the lid distal to the second sidewall, and a closed position, with the side of the lid proximate to the second sidewall and with the lid covering the inner chamber. The end walls each includes a plurality of dividers spaced apart from adjacent ones of the dividers to define a set of guide slots therebetween each with a width greater than an outer diameter of each of the conductors.

The body is formed of a nonconductive material such as a solid cast polyurethane. In some embodiments, the width of the guide slots is less than an outer diameter of a body of each of the connectors, whereby the connectors are physically retained when received in the inner chamber by the dividers of the end walls and the lid when in the closed position.

The guard is configured to sequester energy sources, and the lid. In this regard, the lid includes a hasp with a body and at least one hole therethrough, and one of the dividers includes a recessed surface for receiving the body of the hasp when the lid is in the closed position. Also, the divider includes a hole within the recessed surface that aligns with the hole in the body of the hasp when the lid is in the closed position. The apparatus further includes a locking mechanism with a member selectively positionable through both of the holes when the lid is in the closed position, and the locking mechanism is adapted to require a key or a tool to operate to remove the member from the holes and unlock the lid. In some cases, the locking mechanism is a padlock or an assembly including a bolt and a nut.

In some implementations of the guard, the inner chamber has a length of at least two times a length of the body of the connectors. Further, the inner chamber has a depth greater than the outer diameter of each of the conductors. In some exemplary guards, an inner surface of the lid abuts and is physically supported by, when in the closed position, a pair of shelves comprising upper surfaces of the dividers of the end walls. In these and other guard embodiments, the body further includes a pair of ramps each sloping away from one of the first and second sidewalls and the dividers each include an outer sloped portion extending away from the inner chamber at a slope angle matching that of the ramps. In other embodiments of the guards, the first sidewall includes an outer planar surface opposite the inner chamber that extends orthogonally to the base, and the body further includes a ramp sloping away from the second sidewall at a slope angle in the range of 30 to 60 degrees, whereby the apparatus is adapted for positioning against a vertical wall of a physical structure with the outer planar surface of the first sidewall abutting the vertical wall. In these and other embodiments, the lid includes a communication element or region on an outer surface that includes a decal or label providing hazard communications or make and break instructions for the set of connectors.

DETAILED DESCRIPTION

Briefly, a single conductor connector guard is provided to support use of single conductor, high current, and portable power distribution such as outdoor events, filming sites, and the like. The guard includes a container or housing that is formed of a non-conductive material and that includes a base, two sidewalls, two end walls, and a lid or cover that enclose or define an interior space or inner chamber. The inner chamber is sized and shaped such that ends of pairs of power lines or cables such as single-pole conductors along with connectors affixed to these ends can be wholly received within the container or housing so as to be electrically insulated and protected. The lid or cover may be pivotally attached to one of the sidewalls and mate with a hasp on an opposite sidewall or one of the end walls to allow a padlock or other locking mechanism to be used to lock the guard so as to require a padlock key or tool to gain access. The container or housing would also provide surfaces, such as on an outer side or surface of the lid or cover, for hazard identification and notifications (e.g., safety notifications regarding the connecting and disconnecting order of the connectors as may be required by electrical safety standards or codes).

Advantages of the new conductor connector guard include: (a) electrical junctions or connections can be made in public spaces without additional guarding being required; (b) the guard can be used to provide often required hazard and use notifications to qualified and unqualified personnel; (c) the guard allows for safe methods of device camouflaging such placing trash can on top, wrapping with colored and/or decorative cloths or plastic wrappings, if desired but not as a requirement for guarding as in prior implementations; (d) the connectors are further protected from ultraviolet (UV) and mechanical damage; and (e) the connectors are further protected (e.g., above that required for some electrical applications) against rain, sleet, snow, and external ice formation.

Figure 1:
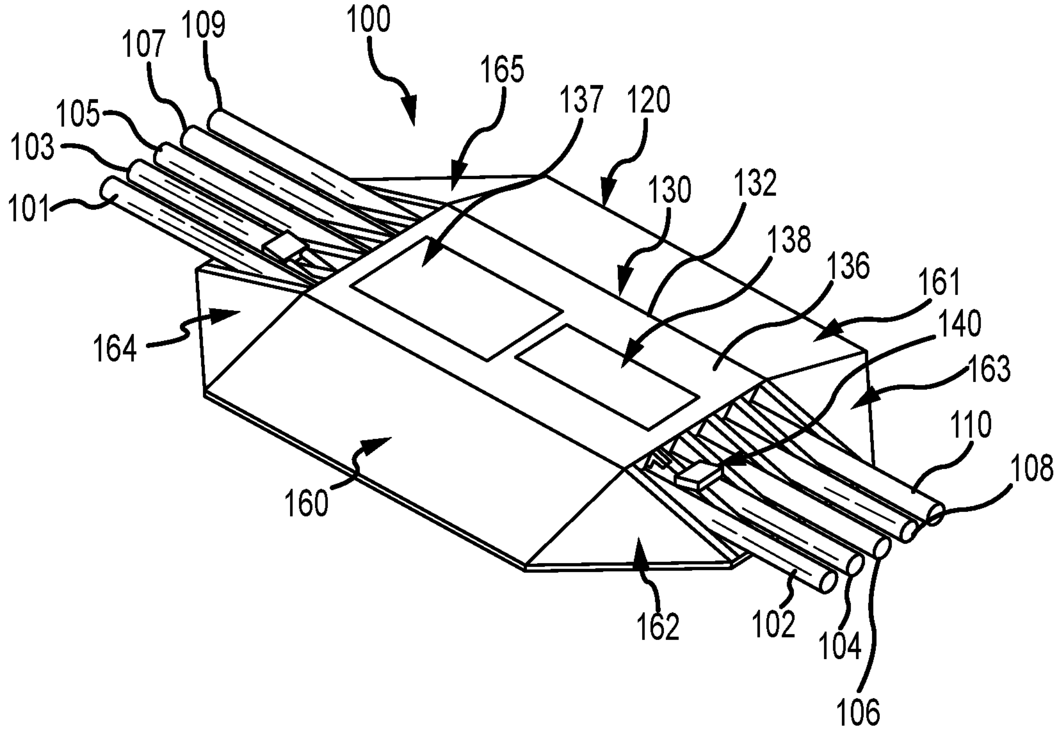
FIG. 1 is a top perspective view of a single conductor connector guard of the present description showing the guard in use and with the lid or cover in a closed position.
Figure 2:
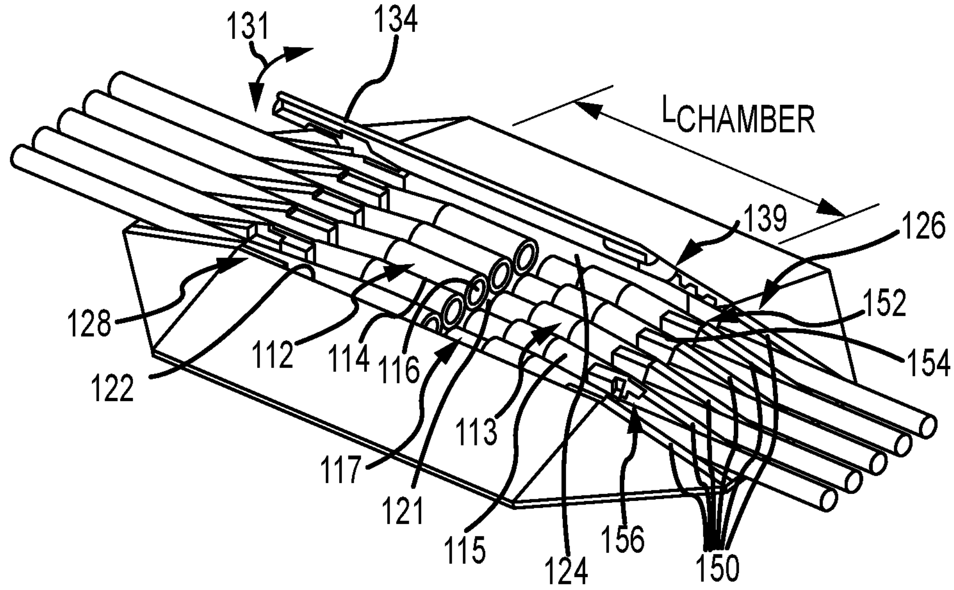
FIG. 2 is a top perspective view of the guard of FIG. 1 showing the lid or cover in an open position and showing the pairs of connectors in an open or disconnected state or configuration.
Figure 4:
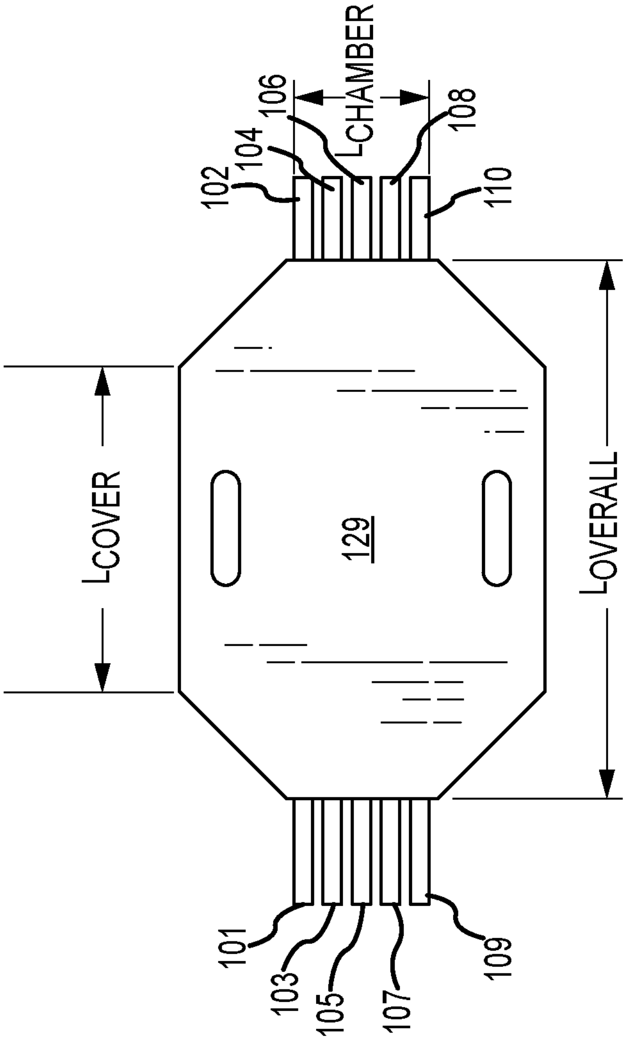
FIG. 4 is a bottom view of the guard shown in FIGS. 1-3.
Figure 5:
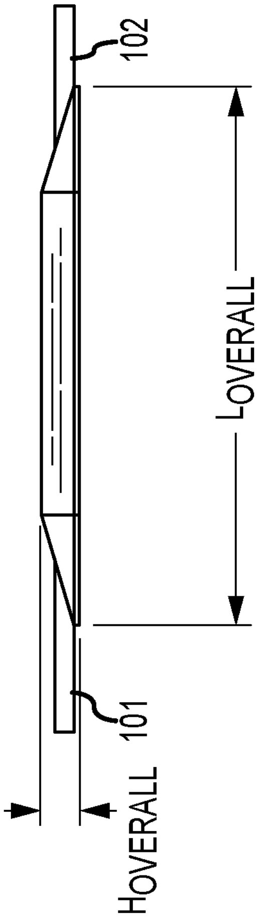
FIG. 5 is a side view of the guard of FIG. 1.
Figure 3:
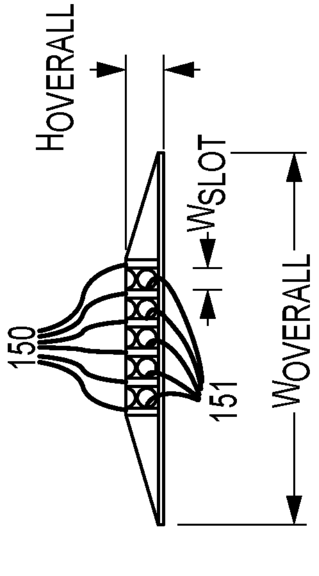
FIG. 3 is an end view of the guard of FIG. 1.

FIG. 1 is a top perspective view of an exemplary embodiment of a single conductor connector guard 100 of the present description showing the guard 100 in use and with the lid or cover 130 in a closed position. FIG. 2 is a top perspective view of the guard 100 of FIG. 1 showing the lid or cover 130 in an open position and showing the pairs of conductors 101 and 102, 103 and 104, 105 and 106, 107 and 108, and 109 and 110 in a disconnected or unmated state or configuration. FIG. 3 is an end view of the guard 100, FIG. 4 is a bottom view of the guard 100, and FIG. 5 is a side view of the guard 100.

As discussed above, the guard 100 is designed to receive and protect a power junction made up of the pairs of conductors 101 and 102, 103 and 104, 105 and 106, 107 and 108, and 109 and 110, which may be in a connected or mated state or in the disconnected or unmated state shown in the figures. To this end, the guard 100 includes a body 120 with an interior space or inner chamber 121 that may be enclosed or exposed for access to the connectors 101-110 via movement or pivoting, as shown with arrow 131, of the lid or cover 130. For example, as shown, the lid 130 may be pivotally attached to the body 120, such as with a hinge-type mount or the like, along a first edge or side 132 while a second edge or side 134 opposite the first side 132 is able to swing away from the body 120 as shown in FIG. 2 and then be pivotally moved 131 to mate with and be supported by other portions of the guard 100 with the lid 130 in the closed position shown in FIG. 1. To ensure electrical isolation, the body may be made of a nonconductive materials such as a plastic (which may be suited to injection molding or other fabrication techniques), with one embodiment utilizing a polyurethane body 120 and lid 130 (e.g., solid cast polyurethane or the like).

The guard 100 may be configured to house one-to-many pairs of conductor connectors, with 3, 5, and 7 being common in some applications. In FIGS. 1-5, five pairs of conductors 101 and 102, 103 and 104, 105 and 106, 107 and 108, and 109 and 110 are shown as may be common in power distribution from a remote source. The conductors 101-110 may take a variety of forms (sizes, gauges, and so on) wires or cables such as #2AWG to #4/0 AWG copper wires, Type SC or Type W cable, and the like. In many applications, the conductors or cables 101-110 will have a maximum outer diameter of about 1 inch.

To facilitate connection or mating and disconnection or unmating of the conductors 101-110 together (e.g., to join two runs or coils of such conductors together in an electrically conductive manner), connectors are provided at their ends. This arrangement is shown in FIG. 2 with the pair of conductors 105 and 106. Upon or over an end of conductor 105, a first connector (e.g., a female connector) 112 is provided that has a body 114 and an end/coupler 116. Upon or over an end of conductor 106, a second connector (e.g., a male connector) 113 is provided that has a body 115 and an end/coupler 117. The connectors 112 and 113 are shown disconnected or unmated (or "open") in FIG. 2 with a spacing between them (e.g., 0.5 to 3 inches or the like), but, in use to distribute power, these connectors 112 and 113 would be engaged together to electrically connect the pair of conductors 105 and 106 (or "terminate" the connectors 112 and 113). Similar connectors are shown on pairs of conductors 101 and 102, 103 and 104, 107 and 108, and 109 and 110 to facilitate connection and disconnection of these conductor pairs. In one embodiment, the connectors 112 and 113 are 400 Amp single pole (or conductor) connectors (e.g., Cam-Lok™ connectors or the like).

A typical maximum outer diameter of the connectors 112 and 113 may be about 1⅝ inches, and a typical maximum length of the bodies 114, 115 of the connectors 112 and 113 may be about 7 inches. The inner chamber 121 of the body 120 is sized and shaped to fully receive all of connectors 112, 113, which with five pairs would be ten connectors, with the lid 130 in the closed position and with the connectors, such as connector pair 112, 113 being in the open or unmated configuration as shown in FIG. 2. The chamber 121 is a recessed space in the body 120 that is defined by two spaced apart sidewalls 122, 124, two spaced apart end walls 126, 128, and a floor or base 129 and that may be enclosed by positioning 131 the lid 130 in the closed position shown in FIG. 1.

In general, the walls 122, 124, 126, and 128 extend orthogonally from the base 129 (such as vertically with the base 129 placed in a use position with it mating with the ground, a floor, or other horizontal supporting surface) a distance to allow room for the connectors 112, 113. As shown in FIGS. 4 and 5, the overall height, $H_{Overall}$, of the body 120 is measured from an outer surface of the base 129 to an upper surface 136 of the lid 130 or an upper edge of the walls 122, 124, 126, and 128 (whichever is greater). For connectors 112, 113 with a maximum outer diameter of 1.625 inches or the like, the overall height, $H_{Overall}$, may be in the range of 1.9 to 3 inches, with 2 inches used in one embodiment such that when the thicknesses of the base 129 and lid 130 are considered the depth of the chamber 121 is at least as great as the outer diameter of the largest connector 112, 113 (such as with a clearance over the maximum expected connecter diameter of 0.125 to 0.25 inches or more to ensure the lid 130 can properly close, which provides a chamber depth of about 1.75 to 1.875 inches in some preferred embodiments).

Further, the walls 122, 124, 126, and 128 configured to have an adequate width, $W_{Chamber}$, and length, $L_{Chamber}$, to receive all five connector pairs with the connectors arranged as shown in FIG. 2 to be parallel and side-by-side, as well in both the open or unmated configuration shown in FIG. 2. In this regard, the sidewalls 122, 124 that extend parallel to the longitudinal axis of the body 120 (and received cables 101-110) are spaced apart a distance that is greater than five times the maximum expected connector outer diameter (such as by a clearance of 0.125 to 0.75 inches). In one exemplary implementation, the inner chamber 121 has a width, $W_{Chamber}$, in the range of 8 to 10 inches with one particular embodiment using 8.59 inches when the expected connectors had outer diameters of 1.625 inches (or a width, $W_{Chamber}$, that is 5 times the connector OD plus a clearance of about 0.4 to 0.5 inches).

The chamber length, $L_{Chamber}$, is defined by the spacing between inner surfaces or sides of end walls 126 and 128, and it is chosen to be twice the maximum expected length of the connectors 112, 113 plus an added spacing value to allow the ends 116 and 117 of the bodies 114, 115 to be apart a distance (e.g., 0.5 to 2 inches or the like) when unmated as shown in FIG. 2. In exemplary embodiment, the chamber length, $L_{Chamber}$, is in the range of 12 to 20 inches and in one particular case is 14 inches with connector bodies 114, 115 of about 7 inches, where each connector had a smaller OD toward a cable end of the body 114, 115 that allows a portion (e.g., 0.25 to 1 inch or more) of the connector 112, 113 to be received in the gap or guide slot between dividers in the end walls 126, 128 so as to provide the desired spacing/gap between unmated ends 116, 117 of the connector bodies 114, 115 in a pair of connectors 112, 113.

As shown, the end walls 126 and 128 are configured to receive and retain a plurality of cables 101-110, with the embodiments being shown able to receive five conductors but it being understood that fewer (e.g., three) or more (e.g., seven) could be received. To this end, as shown with end wall 150, each end wall includes a plurality of dividers or divider walls 150 that are spaced apart from adjacent dividers 150 as distance, $W_{Slot}$, to define a guide slot or gap 151 between such adjacent pairs. The dividers 150 extend parallel to each other, extend orthogonally away from the base 129, and extend parallel to a longitudinal axis of the body 120 of the guard 100. The width, $W_{Slot}$, of each of the guide slots or gaps 151 is larger by some amount than the largest OD of a cable 101-110 to be used with the guard 100. For example, the width, $W_{Slot}$, may be 0.05 to 0.2 inches greater than the largest expected OD of a cable with one embodiment used with 1-inch cables and having guide slots 151 with widths of 1.1 inches. The maximum OD of the connector bodies 114, 116 is greater at 1.625 inches in some case such that the connectors 112, 113 and attached cable ends are retained within the chamber 121 when the cables/conductors 101-110 are inserted into the guide slots 151, with the lid or cover 130 in the open position shown in FIG. 2 (e.g., connectors 112, 113 placed vertically downward into chamber 121 with attached cables/conductors 105, 106 placed into appropriate guide slots 151).

The lid or cover 130 may have a length, $L_{Cover}$, longer than the width, WChamber, of the chamber 121, such as 18 inches when the chamber 121 has a length, $L_{Chamber}$, of 14 inches (e.g., a lid length greater than the chamber length by 2 to 6 inches or the like with 4 inches used in this example). This may be desirable to retain the connectors, including connectors 112, 113, within the chamber 121 so as to sequester the energy source and enhance public safety. As shown in FIG. 2, each divider 150 extends inward to an inner, vertical side or edge 154 that faces into the chamber 121, and a recessed surface or ledge 152 is provided between this inner edge 154 and the exterior portion of the divider 150, which may be sloped downward at a desired angle matching those of other exterior ramps of the guard 100 such as at 30 to 60 degrees with 45 degrees used as the ramp angle in some guards 100. The recessed surfaces or ledges 152 of all the dividers 150 act together to provide a lip or shelf for contacting the inner surface/side of the lid 130 when it is positioned 131 into the closed position shown in FIG. 1. Further, a lip/shelf may be provided on upper edges/sides of the two sidewalls 122, 124 of the body 120 to receive and support the lid 130 (or sides/edges 132, 134) when the lid 130 is in the down and closed position shown in FIG. 1. With the lid 130 in the closed position, the connectors 112, 113 and cables/conductors 101-110 are blocked from being lifted out of the chamber 121 or the guide slots/gaps 151 between dividers 150.

With the lid 130 in the closed position as shown in FIG. 1, it can be seen that the lid 130 is adapted to allow the guard 100 to be used to provide labeling for communicating desired information to the general public and to users or workers making use of the guard 100. As shown, the top or outer surface/side 136 of the lid 130 has a pair of communication regions or elements 137 and 138. The first communication element region/element 137 may be used to provide hazard communications to the public regarding the electrical components and/or power junction contained within the guard 100 and useful safety precautions related to the guard contents. This may include a warning sticker/decal affixed to the surface 136 as the communications region/element 137. The second communication element/region 138 may be used to provide worker/user instructions such as make and break instructions that may include the order in which to connect and/or disconnect pairs of the connectors 112, 113 for cables/conductors 101-110 (such as based on the colors of the connector pairs).

The body 120 of the guard 100 further includes a plurality of ramps or ramp-shaped side members extending outward from the sidewalls 122 and 124 and end walls 126 and 128. First and second side ramps 160 and 162 extend outward form sidewalls 122 and 124, respectively, to define a continuous sloped surface (such as at an angle of 45 degrees or another useful slope or ramp angle in the range of 30 to 60 degrees or the like) from a top edge/side of the sidewalls 122 and 124 to a plane containing the horizontal base 129 of the guard body 120. Corner ramps 162, 163, 164, and 165 are provided in the body 120 and extend outward from the corners of the inner chamber 121 between the side ramps 160, 162 and the sloped/angled outer portion of the dividers 150 of the end walls 126 and 128 (e.g., to define sloped surfaces at slope/ramp angles matching or similar to those of the side ramps 160, 162). In this manner, the guard 100 provides a minimal trip hazard in areas of expecting foot traffic and facilitates use of wheel chairs, strollers, and the like in the public space, too.

It is preferable in many applications that the guard 100 be configured for use as a lock and tagout device. To this end, the end walls 126 and 128 and lid 130 are designed with features that allow them to be locked together with a locking mechanism that requires a tool (e.g., a key, a wrench, a screwdriver, or the like) to be used to disengage (and, often, engage) the locking mechanism and disconnect the lid 130 from the end walls 126 and 128. In the embodiment shown in FIGS. 1 and 2, a pair of locking mechanisms are provided in the form of two pad locks 140 provided to lock the lid at each end to one of the two end walls 126 and 128. Specifically, a hasp 139 is provided on each of the end/edges of the lid 130 that extends outward a distance to mate with or be aligned with a lock mating element 156 (e.g., a recessed surface and hole/aperture in a divider 150), and the locking mechanism (e.g., padlock in the first example) 140 is passed through the hasp 139 (i.e., hole in the hasp 139) and the lock mating element 156 to lock or affix the lid 130 in a closed position over the inner chamber 121 as shown in FIG. 1.

Figure 6A:
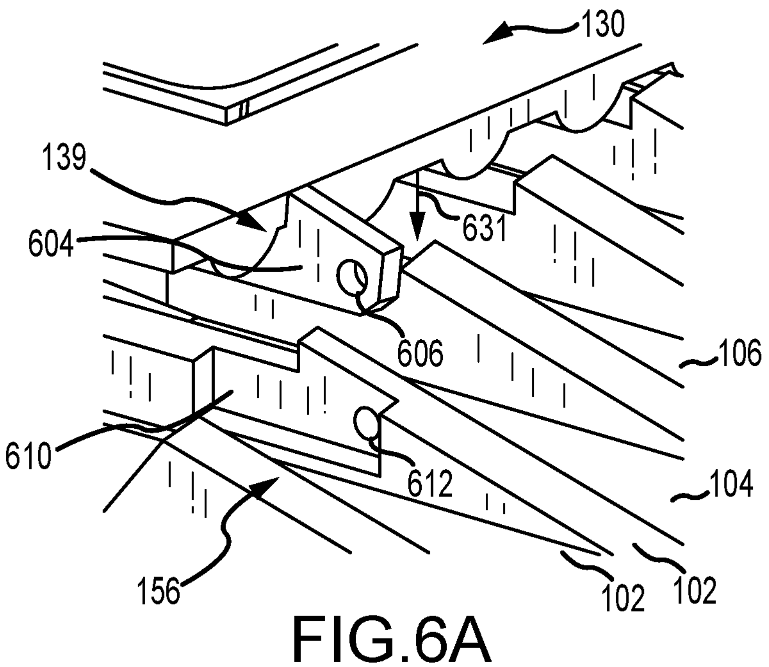
FIGS. 6A-6D are enlarged views of a portion of the guard of FIGS. 1 and 2 showing details of the components used in locking the lid in the closed position against the body end walls.
Figure 6B:
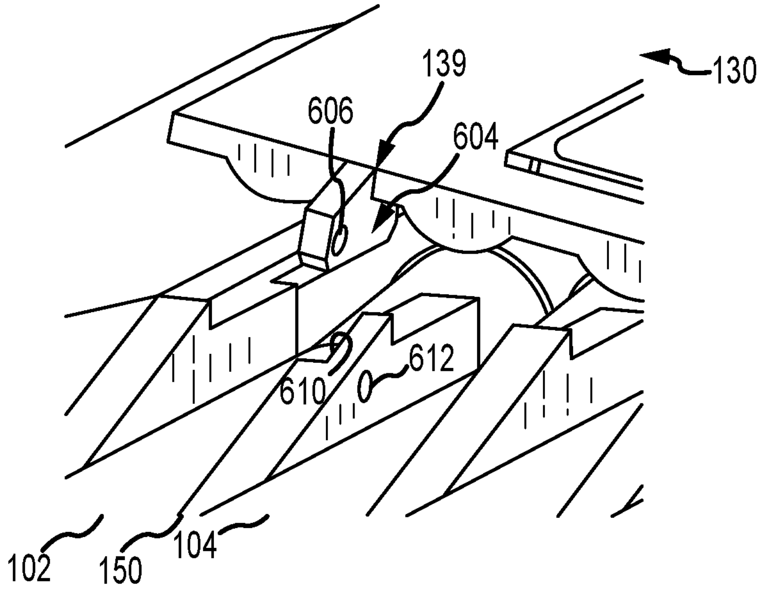

FIGS. 6A-6D are enlarged views of a portion of the guard 100 of FIGS. 1 and 2 showing details of the components used in locking the lid 130 in the closed position against the body end walls 126 and 128. Particularly, FIG. 6A shows the lid 130 as it is being moved (as shown by arrow 631) downward from an open and unlocked position (as shown in FIG. 2) to a closed position (as shown in FIG. 1). The lid 130 is shown to include the hasp 139 that is made up of a hasp body 604 that extends outward from an end/edge of the lid 130 a distance (such as 0.5 to 2 inches), and the hasp body 604 has a size (length, height, and thickness) selected to provide adequate strength with the material chosen for the guard body 120.

Figure 6C:
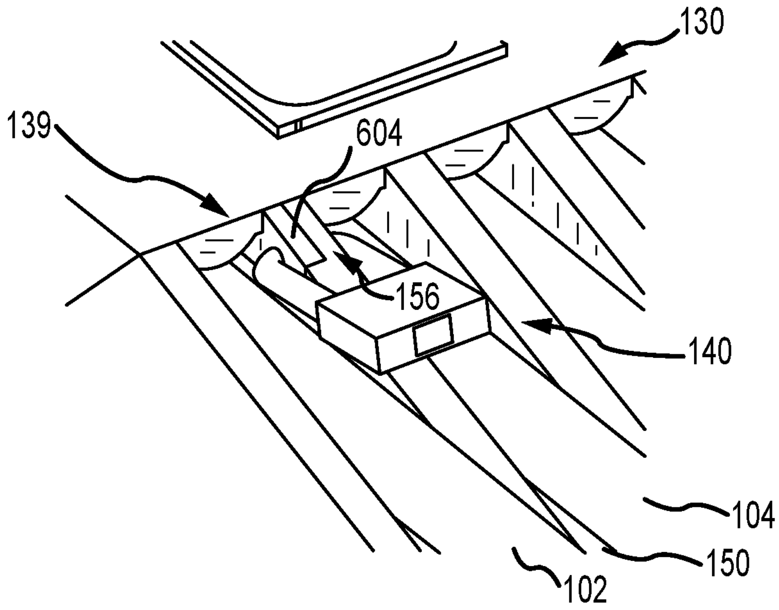
Figure 6D:
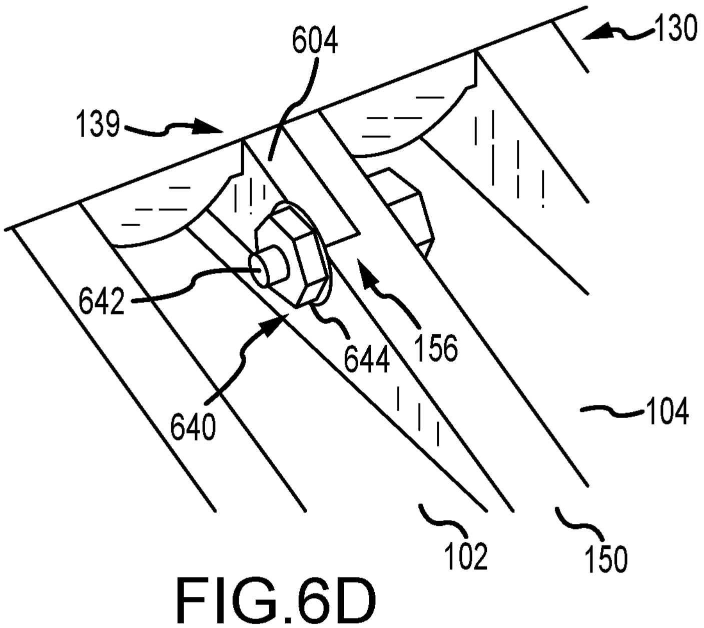

The divider 150 (in this case, one of the intermediate dividers) is adapted to provide the lock mating element 156. In the illustrated embodiment, the element 156 includes a recessed surface 610 in an upper edge of the body of the divider 150. Further, as part of element 156, a hole or aperture 612 is provided through the divider 150 within the recessed surface 610. The shape and size of the recessed surface 610 is chosen to match of the hasp body 604 such that the hasp body 604 can be received within the recessed surface 610 as shown in FIGS. 6C and 6D when the lid 130 is positioned 131 in the closed position. When in the closed position, the hole 606 in the hasp body 604 is lined up with or aligned with the hole 612 in the divider 150 accessible via the recessed surface 610.

FIGS. 6C and 6D illustrate two different locking mechanisms 140 and 640 and that are useful for illustrating that any tool-based locking mechanism may be used with the guard 100 to lock the lid 130 in the closed position and limit access to the contained connectors 112, 113 and ends of cables 101-110. As shown in FIG. 6C, the locking mechanism 140 is provided in the form of a padlock, which can be inserted through the mating holes 606 and 612 and engaged. A key (or combination in some cases) would then be required to disengage the locking mechanism 140 and unlock the lid 130 from the divider 150 of the end wall 126 (or 128). As shown in FIG. 6D, the locking mechanism 640 instead takes the form of a bolt 642 and nut 644 (e.g., a metal or other nut and bolt such as a ¼-20 set or the like). The bolt 642 is shown inserted through the divider 150 and hasp body 604 via holes 606 and 612, and the nut 644 is tightened with a wrench or other tool to engage the locking mechanism 640 and lock the lid 130 in the closed position.

Figure 7:
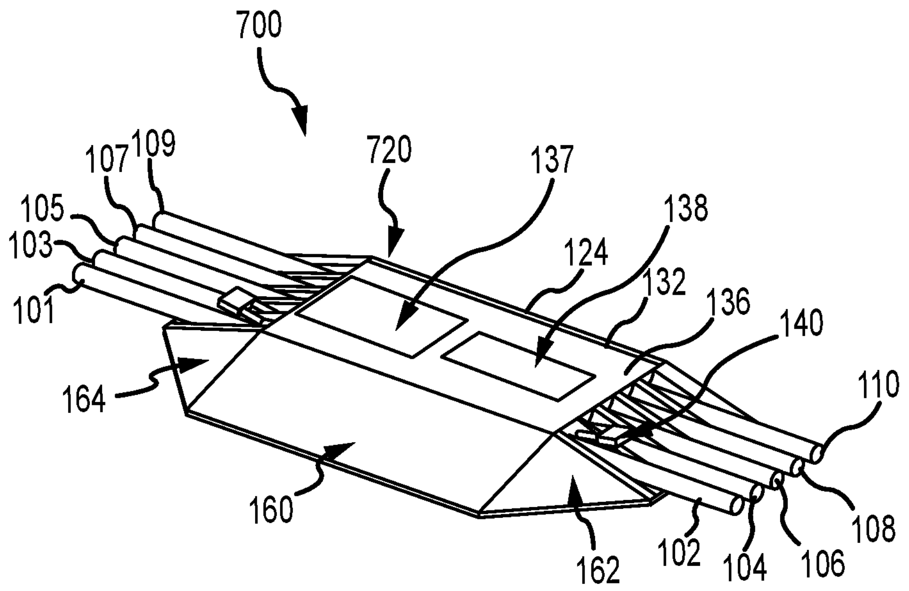
FIG. 7 is a top perspective view of a curbside embodiment of a single conductor connector guard of the present description showing the guard in use and with the lid or cover in a closed position.
Figure 8:
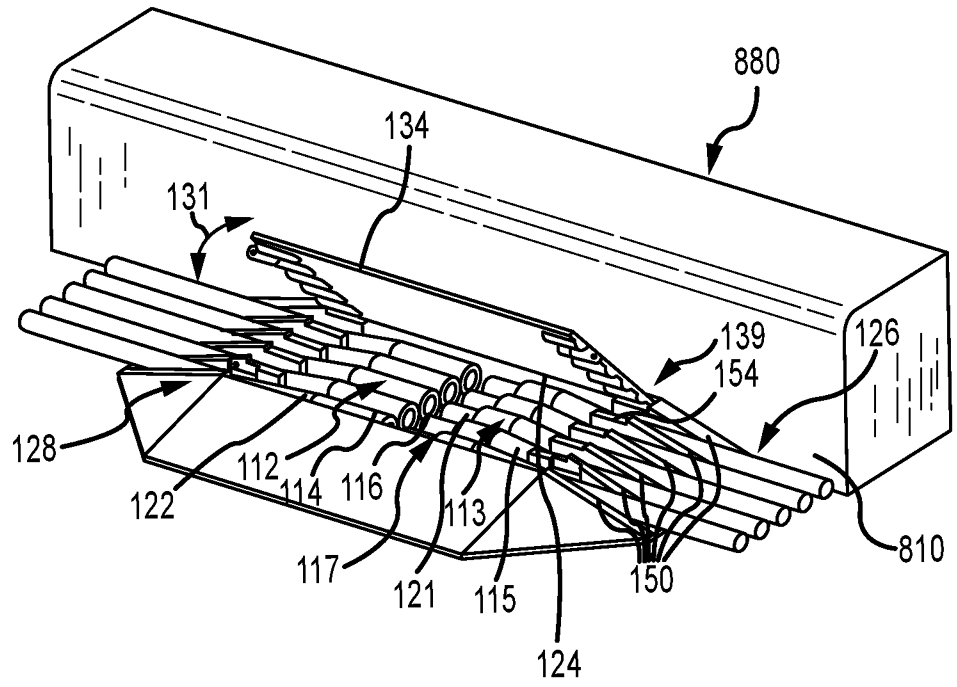
FIG. 8 is a top perspective view of the guard of FIG. 7 showing the lid or cover in an open position and showing the pairs of connectors in an open or disconnected state or configuration.
Figure 9:
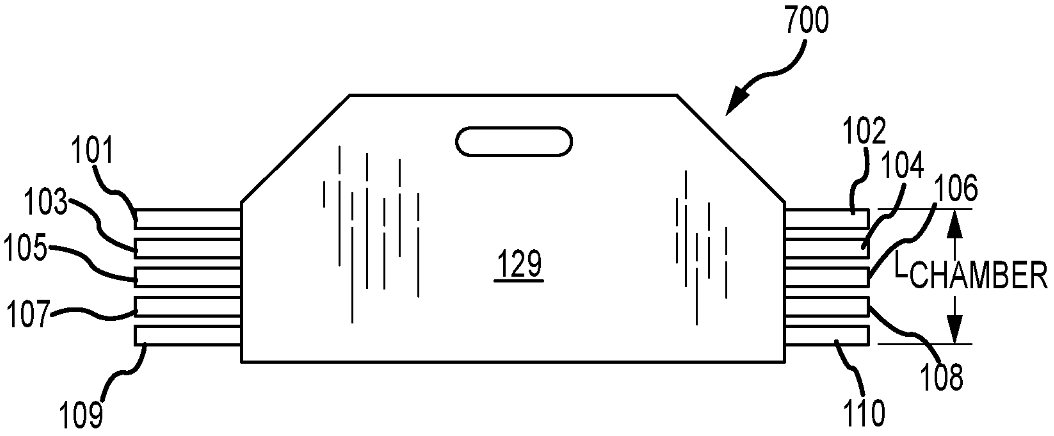
FIG. 9 is a bottom view of the guard shown in FIGS. 7 and 8.
Figure 10:
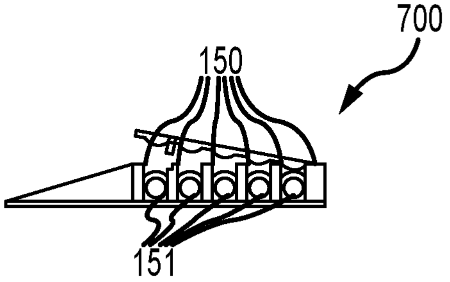
FIG. 10 is a side view of the guard of FIG. 8.

In some applications, it may be desirable for conductors to be run along physical objects such as buildings or street or other curbs. FIG. 7 is a top perspective view of a curbside (or object side) embodiment of a single conductor connector guard 700 of the present description showing, as with FIG. 1, the guard 700 in use and with the lid or cover 130 in a closed position. Many of the same features and components provided in the open space guard 100 are also included in the guard 700, and like numbering is used to refer to these components and the prior description of these components is applicable and not repeated in the following description. FIG. 8 is a top perspective view of the guard 700 showing the lid or cover 130 in an open position and showing the pairs of connectors (such as exemplary connectors 112 and 113) in an open or disconnected state or configuration. FIG. 9 is a bottom view of the guard 700 shown in FIGS. 7 and 8, and FIG. 10 is a side view of the guard 700 in the closed position as shown in FIG. 7.

As shown, the body 720 of the guard 700 differs from the body 120 of guard 100 in that one of the sidewalls 124 and one side of a divider 150 in each of the end walls 126 and 128 are left exposed or unprotected by ramps. Particularly, the ramps 161, 163, and 165 of guard 100 are eliminated from the body 720 of guard 700 so as to provide a planar (or substantially planar) surface or side to the body 700. As shown in FIG. 8, this arrangement is useful in allowing the guard 700 to be positioned adjacent and, often, abutting a vertical (typically planar) surface 810 of a physical object 880 such as a curb as shown in FIG. 8, a base of a building wall, a sidewall of a planter, and the like. This allows the cables/conductors 101-110 to be run or positioned in less intrusive portions of a public space so as to take up less room and provide less of a tripping hazard (e.g., people walking are already aware of the physical structure 880 and step over it when in the space).

We claim:

1. An apparatus for guarding a set of connectors used to electrically connect a set of conductors, the apparatus comprising:

a body; and an inner chamber within the body defined by a planar base, spaced apart first and second sidewalls extending orthogonally from an inner side of the base, a pair of spaced-apart end walls extending from the inner side of the base, and a lid, wherein the lid is pivotally attached to the first sidewall and positionable between an open position with a side of the lid distal to the second sidewall and a closed position with the side of the lid proximate to the second sidewall and with the lid covering the inner chamber, wherein the end walls each comprises dividers spaced apart from adjacent ones of the dividers to define a set of guide slots therebetween each with a width greater than an outer diameter of each of the conductors, and wherein the width of the guide slots is less than an outer diameter of a body of each of the connectors, whereby the connectors are physically retained when received in the inner chamber by the dividers of the end walls and the lid when in the closed position.

2. The apparatus of claim 1, wherein the body is formed of a solid cast polyurethane.

3. The apparatus of claim 1, wherein the lid includes a hasp with a body and at least one hole therethrough, wherein one of the dividers includes a recessed surface for receiving the body of the hasp when the lid is in the closed position, wherein the one of the dividers includes a hole within the recessed surface that aligns with the hole in the body of the hasp when the lid is in the closed position, and wherein the apparatus further includes a locking mechanism with a member selectively positionable through both of the holes when the lid is in the closed position, the locking mechanism being adapted to require a key or a tool to operate to remove the member from the holes and unlock the lid.

4. The apparatus of claim 3, wherein the locking mechanism comprises a padlock or an assembly including a bolt and a nut.

5. The apparatus of claim 1, wherein the inner chamber has a length of at least two times a length of the body of the connectors.

6. The apparatus of claim 1, wherein the inner chamber has a depth greater than the outer diameter of each of the conductors.

7. The apparatus of claim 1, wherein an inner surface of the lid abuts and is physically supported by, when in the closed position, a pair of shelves comprising upper surfaces of the dividers of the end walls.

8. The apparatus of claim 1, wherein the body further comprises a pair of ramps each sloping away from one of the first and second sidewalls and wherein the dividers each include an outer sloped portion extending away from the inner chamber at a slope angle matching that of the ramps.

9. The apparatus of claim 1, wherein the first sidewall includes an outer planar surface opposite the inner chamber that extends orthogonally to the base and wherein the body further comprises a ramp sloping away from the second sidewall at a slope angle in a range of 30 to 60 degrees, whereby the apparatus is adapted for positioning against a vertical wall of a physical structure with the outer planar surface of the first sidewall abutting the vertical wall.

10. The apparatus of claim 1, wherein the lid comprises a communication element on an outer surface and the communication element includes a decal or label providing hazard communications or make and break instructions for the set of connectors.

11. An apparatus for guarding a set of connectors used to electrically connect a set of conductors, the apparatus comprising:

a base;

spaced apart first and second sidewalls extending orthogonally from an inner side of the base;

a pair of spaced-apart end walls extending from the inner side of the base; and a lid, wherein an inner chamber is defined by an upper surface of the base, inner surfaces of the first and second sidewalls and the end walls, and a lower surface of the lid, wherein the lid is pivotally attached to the first sidewall and positionable between an open position with a side of the lid distal to the second sidewall and a closed position with the side of the lid proximate to the second sidewall and with the lower surface of the lid facing the inner chamber, and wherein the lid includes a hasp with a body and at least one hole therethrough, wherein one of dividers includes a recessed surface for receiving the body of the hasp when the lid is in the closed position, wherein the one of the dividers includes a hole within the recessed surface that aligns with the hole in the body of the hasp when the lid is in the closed position, and wherein the apparatus further includes a locking mechanism with a member selectively positionable through both of the holes when the lid is in the closed position, the locking mechanism being adapted to require a key or a tool to operate to remove the member from the holes and unlock the lid.

12. The apparatus of claim 11, wherein the locking mechanism comprises a padlock or an assembly including a bolt and a nut.

13. The apparatus of claim 11, wherein the inner chamber has a length of at least two times a length of the body of the connectors.

14. The apparatus of claim 11, wherein the inner chamber has a depth greater than an outer diameter of each of the conductors.

15. The apparatus of claim 11, wherein the end walls each comprises a plurality of dividers spaced apart from adjacent ones of the plurality of dividers to define a set of guide slots therebetween each with a width greater than an outer diameter of each of the conductors.

16. The apparatus of claim 15, wherein the width of the guide slots is less than an outer diameter of a body of each of the connectors, whereby the connectors are physically retained when received in the inner chamber by the plurality of dividers of the end walls and the lid when in the closed position.

17. An apparatus for guarding a set of connectors used to electrically connect a set of single pole conductors, the apparatus comprising:

a body; and an inner chamber within the body defined by a planar base, spaced apart first and second sidewalls extending orthogonally from an inner side of the base, a pair of spaced-apart end walls extending from the inner side of the base, and a lid, wherein the lid is pivotally attached to the first sidewall and positionable between an open position with a side of the lid distal to the second sidewall and a closed position with the side of the lid proximate to the second sidewall and with the lid covering the inner chamber, wherein the inner chamber has a length of at least two times a length of the body of the connectors, wherein the inner chamber has a depth greater than an outer diameter of each of the conductors, and wherein an inner surface of the lid abuts and is physically supported by, when in the closed position, a pair of shelves comprising upper surfaces of dividers of the end walls.

18. The apparatus of claim 17, wherein the end walls each comprises a plurality of dividers spaced apart from adjacent ones of the plurality of dividers to define a set of guide slots therebetween each with a width greater than an outer diameter of each of the conductors and wherein the width of the guide slots is less than an outer diameter of a body of each of the connectors, whereby the connectors are physically retained when received in the inner chamber by the dividers of the end walls and the lid when in the closed position.

19. The apparatus of claim 17, wherein the lid includes a hasp with a body and at least one hole therethrough, wherein one of the dividers includes a recessed surface for receiving the body of the hasp when the lid is in the closed position, wherein the one of the dividers includes a hole within the recessed surface that aligns with the hole in the body of the hasp when the lid is in the closed position, and wherein the apparatus further includes a locking mechanism with a member selectively positionable through both of the holes when the lid is in the closed position, the locking mechanism being adapted to require a key or a tool to operate to remove the member from the holes and unlock the lid.

20. The apparatus of claim 19, wherein the locking mechanism comprises a padlock or an assembly including a bolt and a nut.

* * * * *